US008976166B2

(12) United States Patent
Han

(10) Patent No.: US 8,976,166 B2
(45) **Date of Patent: *Mar. 10, 2015**

(54) PIXEL, DISPLAY DEVICE USING THE SAME, AND DRIVING METHOD THEREOF

(75) Inventor: Sam-Il Han, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 791 days.

This patent is subject to a terminal disclaimer.

(21) Appl. No.: 12/883,017

(22) Filed: Sep. 15, 2010

(65) Prior Publication Data

US 2011/0193856 A1 Aug. 11, 2011

(30) Foreign Application Priority Data

Feb. 10, 2010 (KR) ........................ 10-2010-0012464

(51) Int. Cl.
*G06F 3/038* (2013.01)
*G09G 3/32* (2006.01)

(52) U.S. Cl.
CPC ...... *G09G 3/3233* (2013.01); *G09G 2300/0819* (2013.01); *G09G 2300/0852* (2013.01); *G09G 2300/0861* (2013.01); *G09G 2310/0262* (2013.01); *G09G 2320/043* (2013.01)
USPC ................. 345/214; 345/76; 345/90; 345/95; 345/208

(58) Field of Classification Search
CPC .................... G09G 3/3233; G09G 2300/0861; G09G 2300/0852; G09G 2320/043; G09G 3/3291; G09G 2310/0262; G09G 2300/0842; G09G 2320/045; G09G 2300/0866; G09G 2310/0251; G09G 3/3208; G09G 2320/0233; G09G 2310/0256; G09G 3/32; G09G 3/3283; G09G 2300/043; G09G 2300/0439; G09G 2310/0205; G09G 2320/0209; G09G 2310/0275; G09G 2310/062; G09G 2320/0223; G09G 2320/0266; G09G 3/14; G06F 3/038
USPC ......... 345/76, 87, 90, 94, 211, 213, 214, 208; 714/731
See application file for complete search history.

(56) References Cited

U.S. PATENT DOCUMENTS

2007/0273619 A1* 11/2007 Kitazawa et al. ............... 345/76
2008/0030435 A1* 2/2008 Kim ................................ 345/76
2009/0167648 A1* 7/2009 Jeon et al. ........................ 345/76

FOREIGN PATENT DOCUMENTS

JP 2008-310128 12/2008
KR 10-2009-0049990 5/2009
KR 1020090046053 A 5/2009

*Primary Examiner* — Amare Mengistu
*Assistant Examiner* — Gloryvid Figueroa-Gibson
(74) *Attorney, Agent, or Firm* — Christie, Parker & Hale, LLP

(57) ABSTRACT

A pixel includes an organic light emitting diode (OLED), a driving transistor for controlling a current supplied to the OLED, a first transistor for transmitting a data signal to the driving transistor, and a capacitor coupled between the driving transistor and the first transistor. A driving method of the pixel includes initializing a gate voltage of the driving transistor, compensating a threshold voltage of the driving transistor, and transmitting a data signal to the driving transistor through the capacitor. A period for compensating the threshold voltage is longer than a period for transmitting the data signal to the driving transistor. Sufficient time to compensate the threshold voltage of the driving transistor of the pixel may be obtained under high resolution and high frequency driving to realize a display device of high image quality.

26 Claims, 6 Drawing Sheets

PIXEL, DISPLAY DEVICE USING THE SAME, AND DRIVING METHOD THEREOF

CROSS-REFERENCE TO RELATED APPLICATION

This application claims priority to and the benefit of Korean Patent Application No. 10-2010-0012464, filed in the Korean Intellectual Property Office on Feb. 10, 2010, the entire content of which is incorporated herein by reference.

BACKGROUND

1. Field

Aspects of embodiments according to the present invention relate to a pixel, a display device including the same, and a driving method thereof.

2. Description of the Related Art

Various kinds of flat display devices that are capable of reducing detriments of cathode ray tube (CRT) devices, such as their heavy weight and large size, have been developed in recent years. Such flat panel display devices include liquid crystal displays (LCDs), field emission displays (FEDs), plasma display panels (PDPs), and organic light emitting diode (OLED) displays. Among these flat panel display devices, the OLED display, which uses OLEDs to generate light by a recombination of electrons and holes for the display of images, has a fast response speed, low power consumption, excellent luminous efficiency, luminance, and viewing angle.

Generally, the OLED display is classified as a passive matrix OLED (PMOLED) and an active matrix OLED (AMOLED) according to a driving method of the OLED. Of these, the active matrix OLED, in which unit pixels are selectively lit, is used instead of the PMOLED for its better resolution, contrast, and operation speed.

A typical pixel of the active matrix OLED includes the OLED, a driving transistor for controlling a current amount supplied to the OLED, and a switching transistor for transmitting a data signal controlling a light emitting amount of the OLED to the driving transistor. However, the driving transistor of the pixel of the active matrix OLED may generate a difference of current flowing to the OLED due to a variation of its threshold voltage or a variation of a power source voltage transmitted to its pixel. This, in turn, may cause luminance variation of the OLEDs from one pixel to another.

In particular, in order to realize high image quality of the display device, high frequency driving may be applied while applying driving timing to the driving circuit of each pixel. In this case, however, it may be difficult to ensure that the time that the threshold voltage of the driving transistor of each pixel is compensated is sufficient, such that the image quality may be deteriorated.

The above information disclosed in this Background section is only for enhancement of understanding of the background of the invention and therefore it may contain information that does not form the prior art that is already known in this country to a person of ordinary skill in the art.

SUMMARY

Aspects of embodiments according to the present invention relate to a pixel, a display device using the same, and a driving method thereof that are capable of ensuring a sufficient threshold voltage compensation time under high resolution and high frequency driving when compensating for a threshold voltage of a driving transistor. More particularly, embodiments of the present invention provide for a driving circuit, a pixel, a display device including the same, and a driving method thereof that are capable of realizing high image quality by providing sufficient time to compensate a threshold voltage of a driving transistor when driving each pixel of the display device by the high resolution and high frequency driving method. The technical features of the present invention are not limited to the above, and other non-mentioned features will be clearly understood by a person of ordinary skill in the art by way of the following description.

According to an exemplary embodiment of the present invention, a display device is provided. The display device includes a display unit, a scan driver, a data driver, and a light emission control driver. The display unit includes a plurality of pixels. The pixels are coupled to a plurality of scan lines, a plurality of data lines, and a plurality of light emission control lines. The scan lines are for transmitting a plurality of scan signals. The data lines are for transmitting a plurality of data signals. The light emission control lines are for transmitting a plurality of light emission control signals. The scan driver is for transmitting the plurality of scan signals. The data driver is for transmitting the plurality of data signals. The light emission control driver is for transmitting the plurality of light emission control signals. Each of the plurality of pixels includes an organic light emitting diode (OLED), a driving transistor, a first transistor, and a first capacitor. The driving transistor is for transmitting a driving current to the OLED according to one of the data signals. The first transistor is for transmitting the one of the data signals to the driving transistor according to one of the scan signals. The first capacitor includes a first terminal and a second terminal. The first terminal is coupled to the first transistor. The second terminal is coupled to a gate electrode of the driving transistor. The first terminal is for receiving an assistance voltage and the second terminal is for receiving an initialization voltage during an initialization period. The initialization period is for initializing a gate voltage of the driving transistor. The driving transistor is further for diode-connecting and the first terminal is further for maintaining the assistance voltage during a threshold voltage compensation period. The threshold voltage compensation period is for compensating a threshold voltage of the driving transistor. The threshold voltage compensation period is longer than a scan period. The scan period is for turning on the first transistor according to a level of the one of the scan signals.

Each of the plurality of pixels may further include a first switch and a second switch. The first switch is for transmitting the initialization voltage to the second terminal. The second switch is for transmitting the assistance voltage to the first terminal.

The plurality of scan lines may include a plurality of second scan lines. The second scan lines are for transmitting an initialization signal to the plurality of pixels. The scan driver may further be for generating the initialization signal and transmitting the initialization signal to each of the pixels through a corresponding one of the plurality of second scan lines. The initialization signal is for controlling the switching operation of the first switch for transmitting the initialization voltage to the second terminal and of the second switch for transmitting the assistance voltage to the first terminal in the plurality of pixels.

For each of the pixels, the initialization signal may be another one of the scan signals. The scan driver may be further for transmitting the other one of the scan signals earlier by a period corresponding to the threshold voltage compensation period than the one of the scan signals.

Each of the plurality of pixels may further include a first switch and a second switch. The first switch is for diode-connecting the driving transistor. The second switch is for transmitting the assistance voltage to the first terminal.

The plurality of scan lines may include a plurality of second scan lines. The second scan lines are for transmitting a threshold voltage compensation signal to the plurality of pixels. The scan driver may further be for generating the threshold voltage compensation signal and transmitting the threshold voltage compensation signal to each of the pixels through a corresponding one of the plurality of second scan lines. The threshold voltage compensation signal is for controlling the switching operation of the first switch for diode-connecting the driving transistor and of the second switch for transmitting the assistance voltage to the first terminal in the plurality of pixels.

Each of the plurality of pixels may further include a first switch. The first switch is for transmitting the driving current from the driving transistor to the OLED according to one of the light emission control signals during a light emitting period. During the light emitting period, the OLED is for receiving the driving current according to the one of the data signals, and emitting light in response to the received driving current.

Each of the plurality of pixels may further include a storage capacitor. The storage capacitor is coupled to a first power source and the gate electrode of the driving transistor. The storage capacitor is for charging a voltage corresponding to the threshold voltage of the driving transistor.

The threshold voltage compensation period may be at least twice the initialization period.

The threshold voltage compensation period may be at least 2 horizontal cycles.

According to another exemplary embodiment of the present invention, a pixel is provided. The pixel includes an organic light emitting diode (OLED), a driving transistor, a first transistor, and a first capacitor. The driving transistor is for transmitting a driving current to the OLED according to a transmitted data signal. The first transistor is for transmitting the data signal to the driving transistor according to a scan signal. The first capacitor includes a first terminal and a second terminal. The first terminal is coupled to the first transistor. The second terminal is coupled to a gate electrode of the driving transistor. The first terminal is for receiving an assistance voltage and the second terminal is for receiving an initialization voltage during an initialization period. The initialization period is for initializing a gate voltage of the driving transistor. The driving transistor is further for diode-connecting and the first terminal is further for maintaining the assistance voltage during a threshold voltage compensation period. The threshold voltage compensation period is for compensating a threshold voltage of the driving transistor. The threshold voltage compensation period is longer than a scan period for turning on the first transistor according to a level of the scan signal.

The pixel may further include a first switch and a second switch. The first switch is for transmitting the initialization voltage to the second terminal. The second switch is for transmitting an assistance voltage to the first terminal.

The first switch and the second switch may further be for receiving an initialization signal. The initialization signal is for controlling a switching operation of the first switch and the second switch from a scan driver. The scan driver is for generating and transmitting the scan signal and the initialization signal.

The initialization signal may be an other scan signal. The scan driver may further be for transmitting the other scan signal earlier by a period corresponding to the threshold voltage compensation period than the scan signal.

The pixel may further include a first switch and a second switch. The first switch is for diode-connecting the driving transistor. The second switch is for transmitting the assistance voltage to the first terminal.

The first switch and the second switch may further be for receiving a threshold voltage compensation signal. The threshold voltage compensation signal is for controlling a switching operation of the first switch and the second switch from a scan driver. The scan driver is for generating and transmitting the threshold voltage compensation signal.

The pixel may further include a first switch. The first switch is for transmitting the driving current from the driving transistor to the OLED according to a light emission control signal during a light emitting period. During the light emitting period, the OLED is for receiving the driving current according to the data signal, and emitting light in response to the received driving current.

The pixel may further include a storage capacitor. The storage capacitor is coupled to a first power source and the gate electrode of the driving transistor. The storage capacitor is for charging a voltage corresponding to the threshold voltage of the driving transistor.

The threshold voltage compensation period may be at least twice the initialization period.

The threshold voltage compensation period may be at least 2 horizontal cycles.

According to yet another exemplary embodiment of the present invention, a method for driving a pixel is provided. The pixel includes an organic light emitting diode (OLED), a driving transistor, a first transistor, and a capacitor. The driving transistor is for controlling a current supplied to the OLED. The first transistor is for transmitting a data signal to the driving transistor. The capacitor is coupled between the driving transistor and the first transistor. The method includes initializing a gate voltage of the driving transistor, compensating a threshold voltage of the driving transistor, and transmitting a data signal to the driving transistor through the capacitor. A period for compensating the threshold voltage is longer than a period for transmitting the data signal to the driving transistor.

The initializing the gate voltage may include applying an assistance voltage to a first terminal of the capacitor coupled to the first transistor, and applying an initialization voltage to a second terminal of the capacitor coupled to a gate electrode of the driving transistor.

The compensating the threshold voltage may include applying an assistance voltage to the first terminal of the capacitor coupled to the first transistor, diode-connecting the driving transistor; and charging a voltage corresponding to the threshold voltage of the driving transistor to a storage capacitor while the driving transistor is diode-connected. The storage capacitor is coupled between a gate electrode of the driving transistor and a first power source.

The period for compensating the threshold voltage may be at least twice a period for initializing the gate voltage of the driving transistor.

The period for compensating the threshold voltage may be at least 2 horizontal cycles.

According to still another exemplary embodiment of the present invention, a method for driving a display device is provided. The display device includes a plurality of pixels. Each of the pixels includes an organic light emitting diode (OLED), a driving transistor, a first transistor, and a capacitor. The driving transistor is for controlling a current supplied to the OLED. The first transistor is for transmitting a data signal to the driving transistor. The capacitor is coupled between the driving transistor and the first transistor. The method includes initializing a gate voltage of the driving transistor, compensating a threshold voltage of the driving transistor, and transmitting a data signal to the driving transistor through the capacitor. A period for compensating the threshold voltage is longer than a period for transmitting the data signal to the driving transistor.

The initializing the gate voltage includes applying an assistance voltage to a first terminal of the capacitor coupled to the first transistor, applying an initialization voltage to a second terminal of the capacitor coupled to a gate electrode of the driving transistor.

The compensating the threshold voltage comprises applying an assistance voltage to the first terminal of the capacitor coupled to the first transistor, diode-connecting the driving transistor, and charging a voltage corresponding to the threshold voltage of the driving transistor to a storage capacitor coupled between a gate electrode of the driving transistor and a first power source while the driving transistor is diode-connected.

The method may further include applying and maintaining an assistance voltage to the first terminal of the capacitor coupled to the first transistor during a period for initializing the gate voltage and the period for initializing the threshold voltage.

A period for compensating the threshold voltage may be at least twice a period for initializing the gate voltage of the driving transistor.

The period for compensating the threshold voltage is at least 2 horizontal cycles.

According to exemplary embodiments of a pixel, a display device including the same, and a driving method thereof, sufficient time to compensate the threshold voltage of the driving transistor may be obtained under high resolution and high frequency driving to realize a display device of high image quality. Accordingly, in embodiments of the driving circuit of the pixel using the high resolution and high frequency driving method, the compensation period of the threshold voltage of the driving transistor is sufficient such that each of the plurality of pixels of an exemplary display device has a complete threshold voltage compensation capability. Thus, the display device may realize a high quality display.

BRIEF DESCRIPTION OF THE DRAWINGS

The accompanying drawings, together with the specification, illustrate exemplary embodiments of the present invention, and, together with the description, serve to explain the principles of embodiments of the present invention.

DETAILED DESCRIPTION

Figure 1:
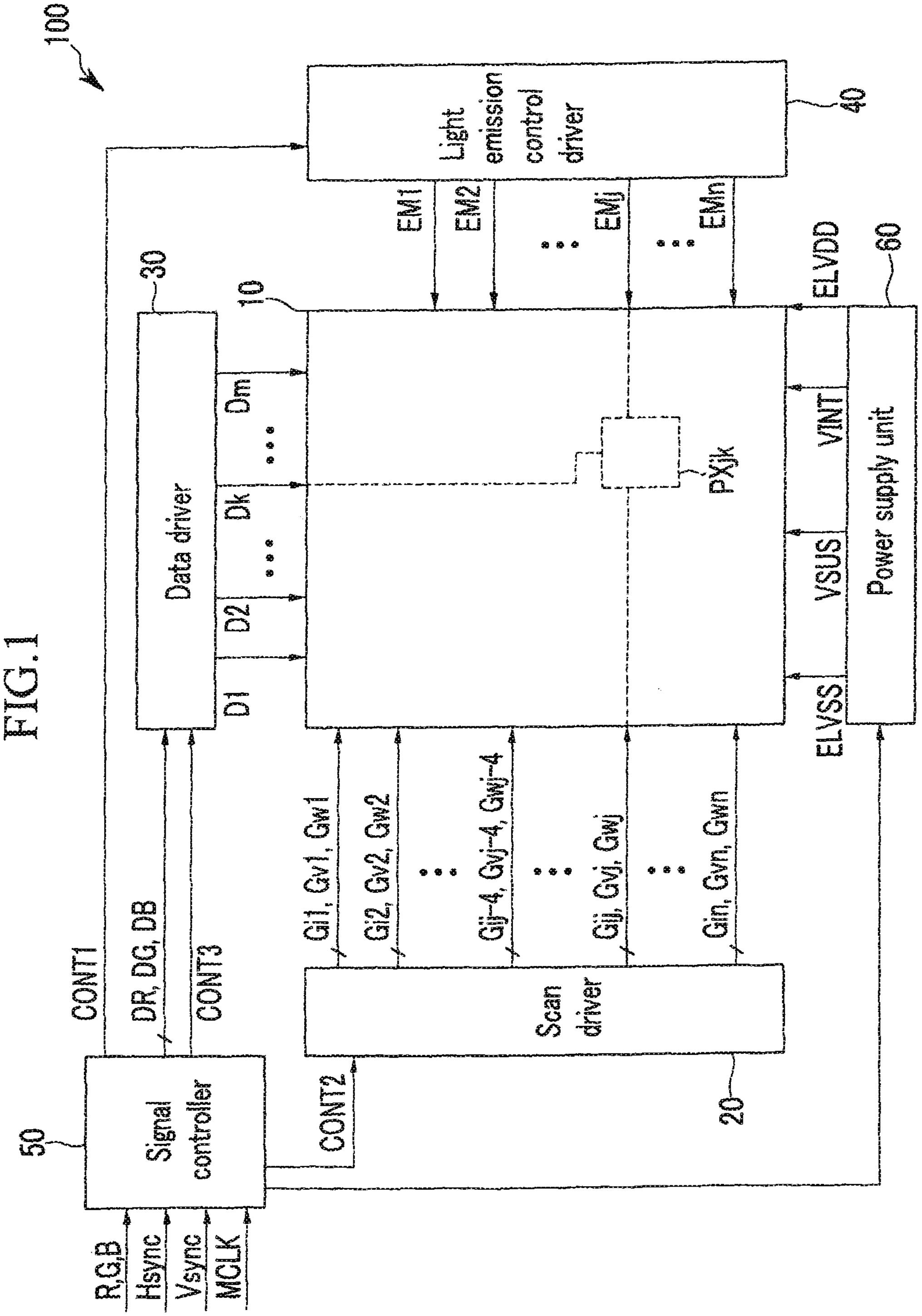
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Constituent elements having the same structure throughout multiple embodiments are denoted by the same reference numeral and are described in a first embodiment. In later embodiments, descriptions of these same constituent elements may be omitted. In addition, to clarify description of embodiments of the present invention, parts not related to the description may be omitted. In addition, like reference numerals designate like elements and similar constituent elements throughout the specification. Further, power sources and their corresponding voltages may be referred to with the same reference name where the appropriate meaning is apparent from context.

Throughout this specification and the claims that follow, when it is described that an element is "coupled" to another element, the element may be "directly coupled" (e.g., connected) to the other element or "indirectly coupled" (e.g., electrically coupled or electrically connected) to the other element through one or more third elements. In addition, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment of the present invention.

Referring to FIG. 1, a display device 100 according to an exemplary embodiment of the present invention includes a display unit 10 including a plurality of pixels PXjk coupled to a plurality of scan lines Gi1 to Gin, Gv1 to Gvn, and Gw1 to Gwn, a plurality of light emission control lines EM1 to EMn, and a plurality of data lines D1 to Dm; a scan driver 20 for providing scan signals to each pixel PXjk through the plurality of scan lines Gi1 to Gin, Gv1 to Gvn, and Gw1 to Gwn; a light emission control driver 40 for providing light emission control signals to each pixel PXjk through the plurality of light emission control lines EM1 to EMn; a data driver 30 for providing data signals to each pixel PXjk through the plurality of data lines D1 to Dm; and a signal controller 50 for controlling the signals that are generated in and transmitted from the scan driver 20, the data driver 30, and the light emission control driver 40.

The plurality of pixels PXjk are located in crossing regions of the scan lines Gi1 to Gin, Gv1 to Gvn, and Gw1 to Gwn, the data lines D1 to Dm, and the light emission control lines EM1 to EMn, and are arranged substantially in a matrix. The pixels PXjk are supplied with a first power source voltage ELVDD, a second power source voltage ELVSS, a reset initialization voltage VINT, and an assistance voltage VSUS from a power supply unit 60 controlled through the signal controller 50. In an exemplary arrangement of the pixels PXjk, the plurality of scan lines Gi1 to Gin, Gv1 to Gvn, and Gw1 to Gwn for transmitting the scan signals extend substantially in a row direction and are substantially parallel to each other, while the plurality of data lines D1 to Dm extend substantially in a column direction and are substantially parallel to each other. However, the present invention is not limited thereto.

In the exemplary embodiment of FIG. 1, for the plurality of scan lines Gi1 to Gin, Gv1 to Gvn, and Gw1 to Gwn coupled to the plurality of pixels PXjk, three scan lines (for example, Gi1, Gv1, and Gw1) are coupled to the corresponding pixels that are arranged in one pixel line. It should be noted, however, that this is only one exemplary embodiment and the present invention is not always limited thereto. In other embodiments, at least two scan lines may be coupled to the corresponding pixel. Each of the pixels PXjk supplies current to an organic light emitting diode (OLED) according to a corresponding data signal, and the OLED emits light of a luminance (for example, a predetermined luminance) according to the supplied current.

Figure 2:
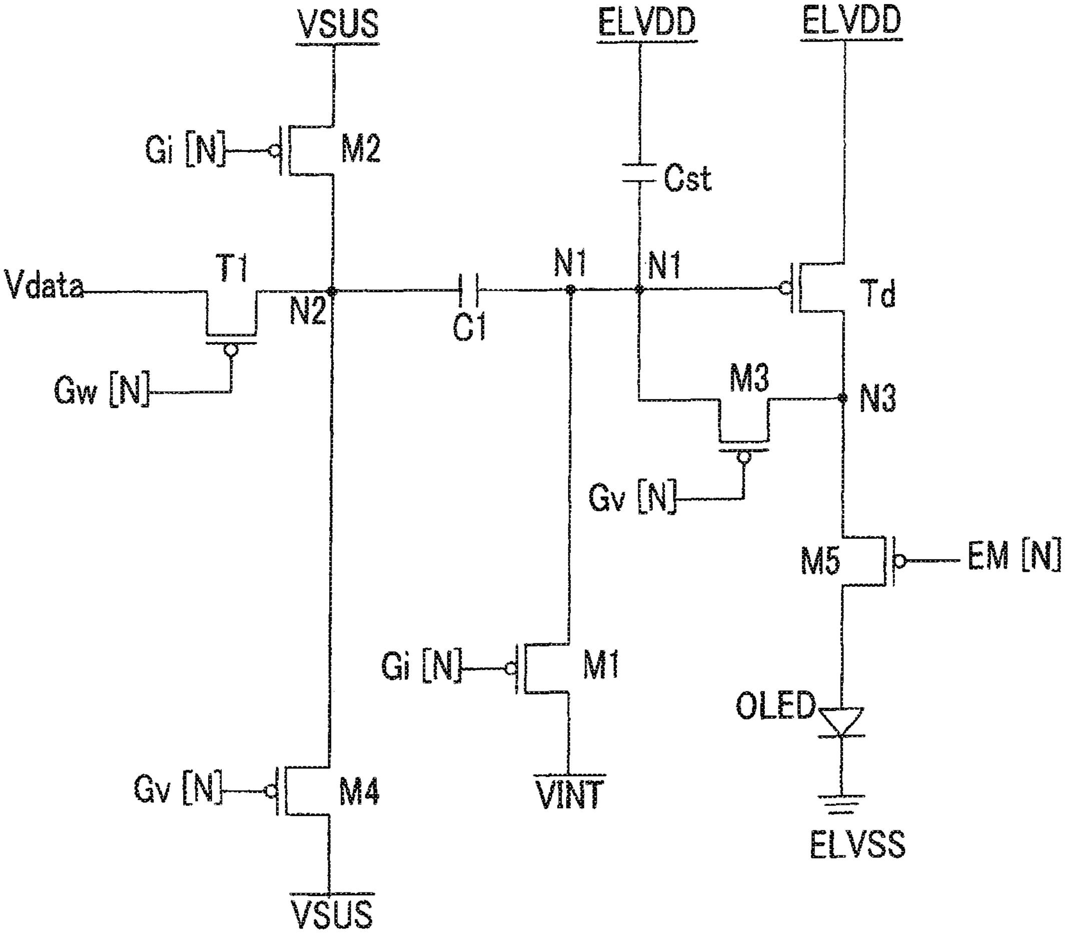
FIG. 2 is a circuit diagram showing a configuration of the pixel shown in FIG. 1 according to an exemplary embodiment.

FIG. 2 is a circuit diagram showing a configuration of the pixel shown in FIG. 1 according to an exemplary embodiment.

Referring to FIG. 2, each pixel PXjk of FIG. 1, for example the pixel PXjk coupled to the three j-th (j=1, 2, . . . , n) scan lines Gij, Gvj, and Gwj, the j-th (i=1, 2, . . . , n) light emission control line EMj, and the k-th (k=1, 2, . . . , m) data line Dk includes an OLED, a driving transistor Td coupled to an anode of the OLED, a first transistor T1 coupled to a gate electrode of the driving transistor Td, a first capacitor C1 coupled between the first transistor T1 and the driving transistor Td, a storage capacitor Cst coupled to the gate electrode of the driving transistor Td and the first power source ELVDD, a first switch M1 for transmitting the initialization voltage VINT to a second electrode (or terminal) of the first capacitor C1, a second switch M2 for transmitting the assistance voltage VSUS to a first electrode (or terminal) of the first capacitor C1, a third switch M3 for diode-connecting the driving transistor Td, a fourth switch M4 for transmitting the assistance voltage VSUS to the first electrode of the first capacitor C1, and a fifth switch M5 having a source electrode coupled to a drain electrode of the driving transistor Td. The OLED of the pixel PXjk includes the anode and a cathode, and is for emitting light by the driving current according to the corresponding data signal.

The driving transistor Td includes a source electrode coupled to the first power source ELVDD, the drain electrode coupled to a third node N3, and the gate electrode coupled to a first node N1. The voltage at the gate electrode corresponds to the data signal. The driving transistor Td is for transmitting the driving current to the OLED according to the data signal transmitted to the pixel.

The first transistor T1 includes a source electrode coupled to a data line Dk for transmitting the data signal Vdata, a drain electrode coupled to a second node N2, and a gate electrode coupled to the scan line Gwj for transmitting the scan signal Gw (also denoted Gw[N] or Gw[j]). When the scan signal Gw is transmitted through the scan line Gwj such that the first transistor T1 is turned on, the data signal Vdata is transmitted to the first capacitor C1, and a voltage corresponding to the data signal is transmitted to the gate electrode of the driving transistor Td according to the voltage charged to the first capacitor C1.

In more detail, the first capacitor C1 includes the first electrode coupled to the first transistor T1 and the second electrode coupled to the gate electrode of the driving transistor Td. The storage capacitor Cst includes one terminal coupled to the gate electrode of the driving transistor Td, that is, the first node N1, and the other terminal coupled to the first power source ELVDD. The storage capacitor Cst maintains a difference of the gate electrode voltage and the source electrode voltage of the driving transistor Td.

If the data signal Vdata is transmitted to the first capacitor C1, a voltage divided according to the capacitance of the first capacitor C1 and that of the storage capacitor Cst is transmitted to the gate electrode of the driving transistor Td. This voltage is the voltage corresponding to the above-described data signal Vdata, and the storage capacitor Cst maintains the difference between this voltage and the first power source voltage ELVDD until the next data signal is written. That is, if the data signal Vdata is transmitted to the first capacitor C1, the voltage of the first node N1 is changed by a voltage corresponding to the difference between the data signal Vdata and the assistance voltage VSUS compared with a voltage at the first node N1 after a threshold voltage compensation period. This voltage is transmitted to the gate electrode of the driving transistor Td, and the voltage difference between the gate electrode and the source electrode of the driving transistor Td is uniformly maintained by the storage capacitor Cst.

The pixel PXjk according to an exemplary embodiment of the present invention includes a switch for transmitting an initialization voltage VINT and a switch for transmitting the assistance voltage VSUS during an initialization period for initializing the gate voltage of the driving transistor Td. In the exemplary embodiment of FIG. 2, the switch for transmitting the initialization voltage VINT is the first switch M1. The first switch M1 includes a source electrode coupled to the initialization power source and input with the initialization voltage VINT, a drain electrode coupled to the first node N1, and a gate electrode coupled to the scan line Gij for transmitting an initialization signal Gi (also denoted Gi[N] or Gi[j]). When the first switch M1 is turned on by the initialization signal Gi, the initialization voltage VINT is transmitted to the second electrode of the first capacitor C1.

In an exemplary embodiment of the present invention, the assistance voltage VSUS is applied during the period (for example, the initialization period) in which the initialization voltage VINT is applied, such that the voltage of the first electrode line of the first capacitor C1 may be prevented from being floated. In the exemplary embodiment of FIG. 2, the assistance voltage VSUS is input to the second node N2 by the operation of the second switch M2. The second switch M2 includes a gate electrode coupled to the scan line Gij for transmitting the initialization signal Gi, a source electrode coupled to the assistance power source VSUS, and a drain electrode coupled to the second node N2.

In an exemplary embodiment of the present invention, the initialization signal Gi that is transmitted to the first switch M1 and the second switch M2 may be a signal that is generated and transmitted independently (for example, along a plurality of second scan lines Gi1 to Gin) from the scan signal Gw, which is generated in the scan driver 20 and transmitted by the plurality of scan lines Gw1 to Gwn. That is, the scan lines coupled to the pixel PXjk of FIG. 2 may further include a second scan line Gij for transmitting the initialization signal Gi. The scan driver 20 generates the initialization signal Gi for controlling the switching operation of the first switch M1 for transmitting the initialization voltage VINT to the second electrode of the first capacitor C1 and the second switch M2 for transmitting the assistance voltage VSUS to the first electrode of the first capacitor C1 in the pixel PXjk, and transmits the initialization signal Gi to the corresponding second scan line Gij.

On the other hand, in another exemplary embodiment, the initialization signal may be a scan signal (not shown) that is transmitted at an earlier time (corresponding to a length of the threshold voltage compensation period) than the time when the corresponding scan signal Gw among the plurality of scan signals generated in the scan driver 20 of the display device 100 is transmitted to the scan line Gwj. For example, based on the pixel driving timing of FIG. 3, the scan signal of the earlier time corresponding to the length of the threshold voltage compensation period than the time that the scan signal Gw[j] of the pixel shown in FIG. 2 is transmitted to the j-th scan line Gwj is Gw[j-5] (that is, in FIG. 3, the initialization signal Gi[N] is low in period T1 while the corresponding scan signal Gw[N] is low in period T6, so the initialization signal Gi[N] could be replaced with scan signal Gw[N-5]). Accordingly, scan signal Gw[j-5] may be transmitted instead of the initialization signal Gi[j] that is transmitted to the scan line Gij.

Here, the scan driver 20 is further for generating dummy scan signals to transmit from the first scan line Gi1 to the fifth scan line Gi5. In another exemplary embodiment of the present invention, it is determined that the length of the threshold voltage compensation period is 4 horizontal cycles, so there is a 5 horizontal cycle gap between the initialization signal and the corresponding scan signal. Accordingly, instead of the initialization signal Gi[N], Gw[N-5] is transmitted. An appropriate scan signal may be used instead of the initialization signal according to the length of the threshold voltage compensation period.

The third switch M3 is controlled by a threshold voltage compensation signal Gv. The third switch M3 is turned on during the threshold voltage compensation period, which is when the threshold voltage of the driving transistor Td is compensated. While the third switch M3 is turned on, the driving transistor Td is diode-connected. Concurrently (for example, simultaneously), since the fourth switch M4 is also controlled by the threshold voltage compensation signal Gv, during the threshold voltage compensation period, the fourth switch M4 is turned on, and the assistance voltage VSUS is transmitted from the assistance power source coupled to the fourth switch M4.

In more detail, the third switch M3 includes the third node N3, which is a source electrode coupled to the drain electrode of the driving transistor Td, the first node N1, which is a drain electrode coupled to the gate electrode of the driving transistor Td, and a gate electrode coupled to the scan line Gvj for transmitting the threshold voltage compensation signal Gv (also denoted Gv[N] or Gv[j]). The fourth switch M4 includes a source electrode coupled to the assistance power source for supplying the assistance voltage VSUS, a drain electrode coupled to the second node N2, and a gate electrode coupled to the scan line Gvj for transmitting the threshold voltage compensation signal Gv.

During the threshold voltage compensation period, the driving transistor Td is diode-connected by the turn-on of the third switch M3 such that the voltage corresponding to the threshold voltage of the driving transistor Td is charged at the first node N1. In this period, the fourth switch M4 concurrently (for example, simultaneously) receives the threshold voltage compensation signal Gv transmitted to the third switch M3 and is turned on. Accordingly, the fourth switch M4 transmits the assistance voltage VSUS to the second node N2.

As mentioned above, in order to solve the problem that a threshold voltage compensation period is reduced under high resolution and high frequency driving of the pixel, such that the image quality is deteriorated, the assistance voltage VSUS is concurrently (for example, simultaneously) input during the threshold voltage compensation period. Consequently, although the threshold voltage compensation period is lengthened to be more than a period (for example, a predetermined period, such as a horizontal cycle), the voltage floating at the second node N2 may be stable. Accordingly, in an exemplary embodiment of the present invention, although the assistance voltage VSUS is applied during the threshold voltage compensation period and the initialization period such that a relatively long threshold voltage compensation period is ensured, a stable driving circuit may be realized.

In FIG. 2, the switching operation of the fifth switch M5 is controlled by the light emission control signal EM[N]. When the fifth switch M5 is turned on by the light emission control signal EM[N] during a light emitting period, the current generated in the driving transistor Td is transmitted to the OLED. The fifth switch M5 includes the source electrode coupled to the drain electrode of the driving transistor Td, a drain electrode coupled to the anode of the OLED, and a gate electrode coupled to the light emission control line EMj.

When the third switch M3 for diode-connecting the driving transistor Td is turned on, the voltage of the first node N1 where the storage capacitor Cst and the first capacitor C1 meet each other becomes the first power source voltage ELVDD offset by the threshold voltage of the driving transistor Td. That is, the voltage that is the threshold voltage of the driving transistor Td subtracted from the first power source voltage ELVDD, is transmitted to the first node N1 of the storage capacitor Cst and the first capacitor C1.

In the above-described circuit shown in FIG. 2, the switches and the transistors included in the driving circuit diagram of the pixel are PMOS. However, the invention is not so limited, and they may be realized in another embodiment as, for example, NMOS.

In an exemplary embodiment of the present invention, the threshold voltage compensation period for providing sufficient compensation of the threshold voltage of the driving transistor Td is not limited. However, it may be longer than the period in which the corresponding data signal is written, that is, when the scan signal Gw among the plurality of scan signals is transmitted to turn on the first transistor T1. In addition, according to another exemplary embodiment, the threshold voltage compensation period is more than at least twice the initialization period, or at least 2 horizontal cycles 2H.

Figure 3:
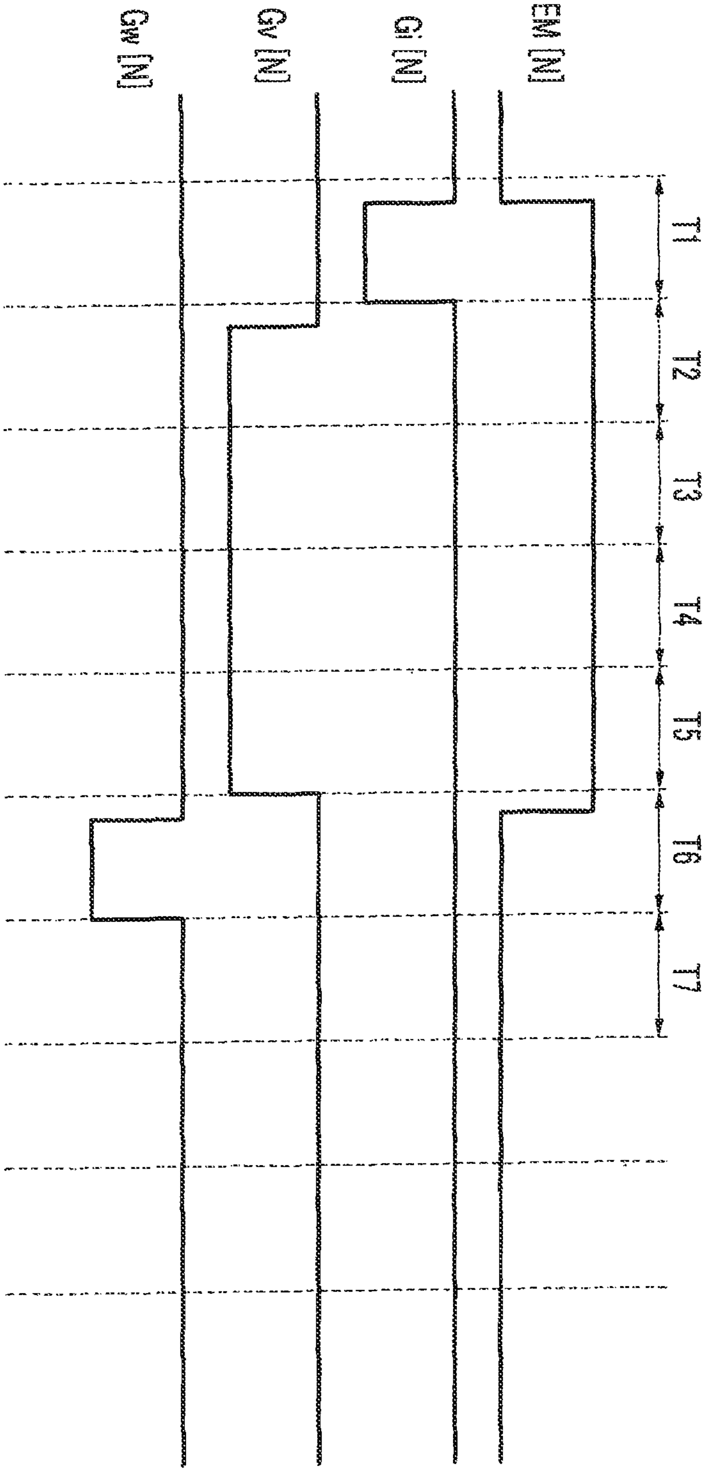
FIG. 3 shows driving timing for driving a pixel of a display device according to an exemplary embodiment of the present invention.

FIG. 3 is a driving timing diagram of driving of a pixel of a display device according to an exemplary embodiment of the present invention.

FIG. 3 shows signals that are transmitted to the pixel operated by the driving circuit shown in FIG. 2. Each transistor or switch of the pixel of FIG. 2 is realized as a PMOS transistor such that the driving timing signals shown in FIG. 3 are represented. If a transistor or switch of the pixel of FIG. 2 is an NMOS transistor, the same operation as the driving of FIG. 3 is executed by signals that are the inverted signals of FIG. 3. One period in FIG. 3 is 1 horizontal cycle 1H.

For example, 1 line time is 14.8 us under FHD 60 Hz driving, however it may be 7.4 us under FHD 120 Hz high frequency driving.

In the driving timings of FIG. 3, a light emission control signal EM[N], an initialization signal Gi[N], a threshold voltage compensation signal Gv[N], and a scan signal Gw[N] are sequentially represented. Starting in a first period T1, the light emission control signal EM[N] is increased (e.g., becomes the high level) such that the fifth switch M5 is turned off while the first transistor T1, the third switch M3, and the fourth switch M4 remain in the off state as their corresponding control signals (that is, scan signal Gw[N] and threshold voltage compensation signal Gv[N]) are the high state in the pixel driving circuit of FIG. 2. However, the initialization signal Gi is the low level and thus, first period T1 corresponds to the initialization period. Accordingly, the first switch M1 and the second switch M2 are turned on in the pixel driving circuit of FIG. 2.

Next, in a second period T2, the initialization signal Gi is increased (e.g., becomes the high level) after the initialization period such that the first switch M1 and the second switch M2 of FIG. 2 are in the off state. Further, the threshold voltage compensation signal Gv becomes the low level such that the third switch M3 and the fourth switch M4 of FIG. 2 are turned on. The other signals, that is, in the pixel driving circuit of FIG. 2, the signals coupled to the first transistor T1 and the fifth switch M5 (i.e., the scan signal Gw[N] and the light emission control signal EM[N]), maintain the high level such that the first transistor T1 and the fifth switch M5 remain switched off.

When the driving transistor Td is diode-connected by the turn-on of the third switch M3, the threshold voltage compensation period begins. At this point, the second electrode of the first capacitor C1, that is, the first node N1, is input with the voltage that is the threshold voltage of the driving transistor Td subtracted from the first power source voltage ELVDD. Concurrently (for example, simultaneously), the fourth switch M4 is also turned on such that the first electrode of the first capacitor C1 may be prevented from being floated. The threshold voltage compensation period is from the second period T2 to a fifth period T5.

In the embodiment of FIG. 3, the threshold voltage compensation period is determined to be about 4 horizontal cycles 4H, where each of the first period T1, the second period T2, etc., is one horizontal cycle 1H. However, the present invention is not limited thereto, and the threshold voltage compensation period may be longer than at least the period in which the scan signal Gw turns on the first transistor such that the data signal is transmitted and the data information is written. In another exemplary embodiment, the threshold voltage compensation period may be longer than the initialization period.

In a sixth period T6, the threshold voltage compensation signal Gv is increased (e.g., becomes the high level), such that the third switch M3 and the fourth switch M4 of FIG. 2 are turned off. In addition, the light emission control signal EM and the scan signal Gw become the low level, thereby starting the scan period and turning on the fifth switch M5 and the first transistor T1 of FIG. 2. In the circuit driving timing according to the exemplary embodiment of FIG. 3, the light emission control signal EM and the scan signal Gw concurrently (for example, simultaneously) become the low level. Accordingly, the corresponding data signal is transmitted from the data line such that the OLED emits the light by the corresponding driving current. In another embodiment, however, after the scan signal Gw is changed to the low level in the sixth period T6, the light emission control signal EM may be changed to the low level in a seventh period T7.

After the scan period, that is, the period that the corresponding pixel among the plurality of pixels is written with the corresponding data signal in one frame such that light is emitted by the driving current, the corresponding scan signal Gw is increased (e.g., becomes the high-level) in the seventh period T7 after light emitting such that the first transistor T1 of FIG. 2 is turned off. The above periods are then repeated in the next frame such that the corresponding data are repeatedly written through the initialization step, the threshold voltage compensation step, and the scan step.

Figure 4:
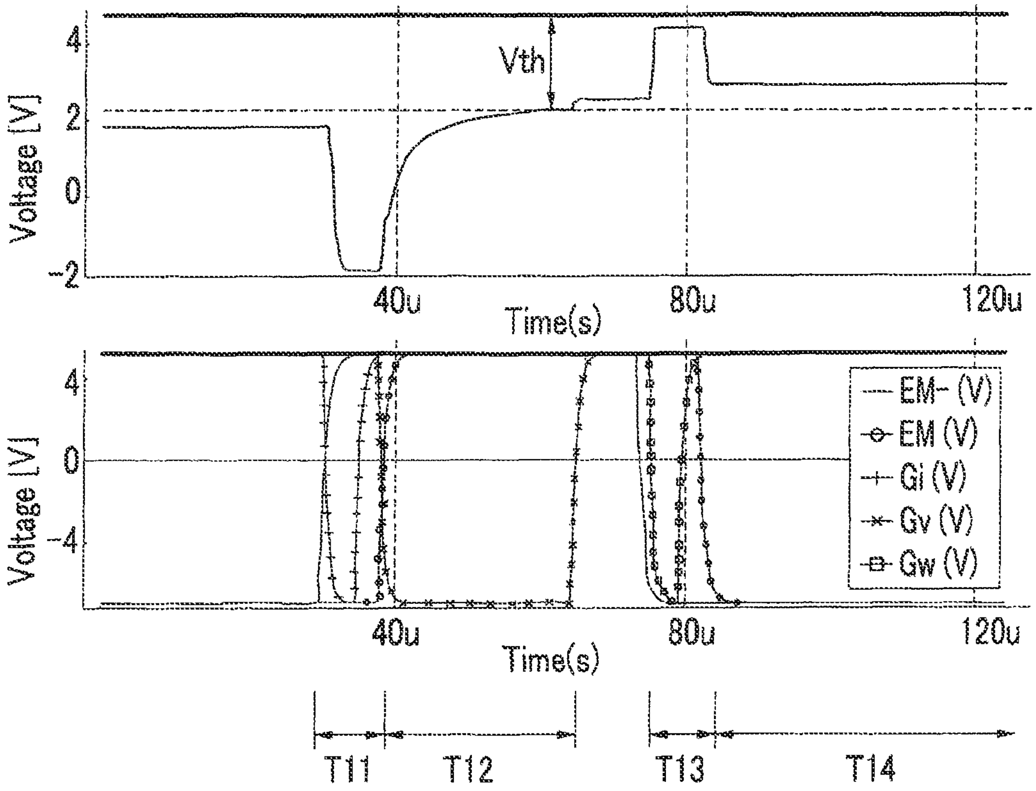
FIG. 4 is a graph showing a threshold voltage compensation capability in pixel driving of a display device according to an exemplary embodiment of the present invention.

FIG. 4 is a graph showing a threshold voltage compensation capability in pixel driving of a display device according to an exemplary embodiment of the present invention.

Referring to FIG. 4, the top graph illustrates a voltage variation at the first node N1 in the circuit diagram of FIG. 2. As shown in the graph, the voltage value of the first node N1 is maintained as the voltage value corresponding to the data signal (for example, a predetermined data signal) in the directly previous frame, is decreased to the initialization voltage at the start of initialization period T11 in which the initialization signal Gi is transmitted, and is increased during threshold voltage compensation period T12 in which the threshold voltage compensation signal Gv is transmitted. From this graph, it may be confirmed that the voltage value of the first node N1 is increased by the voltage value that is the threshold voltage of the driving transistor subtracted from the first power source voltage ELVDD in the threshold voltage compensation period T12. This demonstrates that the threshold voltage of the driving transistor Td is completely compensated through the sufficient compensation time of threshold voltage compensation period T12.

The OLED emits light in light emitting period T14 after data input period T13 in which the voltage value corresponding to the data signal (for example, a predetermined data signal) of the current is applied after the threshold voltage compensation period T12.

Figure 5:
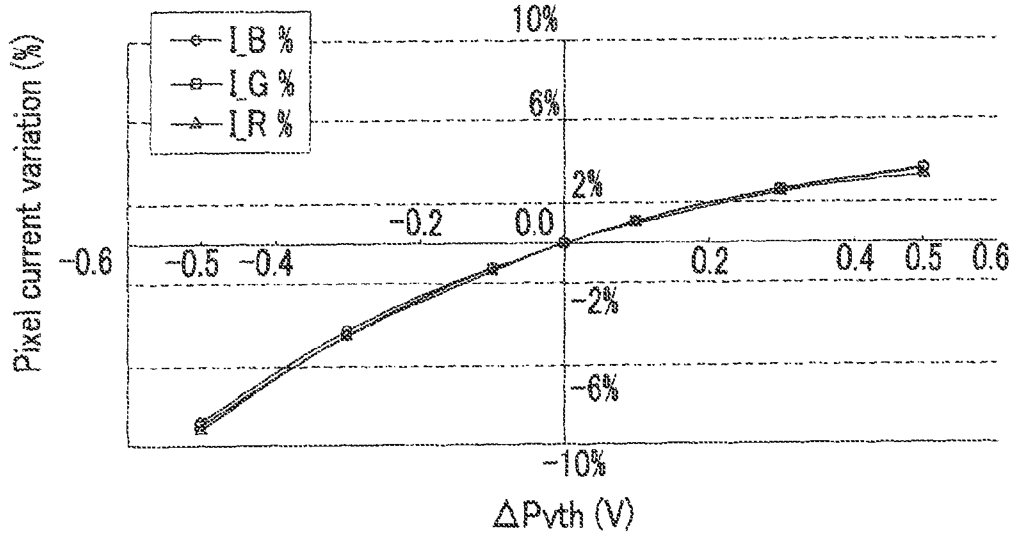
FIG. 5 is a graph showing a current variation of a pixel for a threshold voltage variation in pixel driving of a conventional display device.
Figure 6:
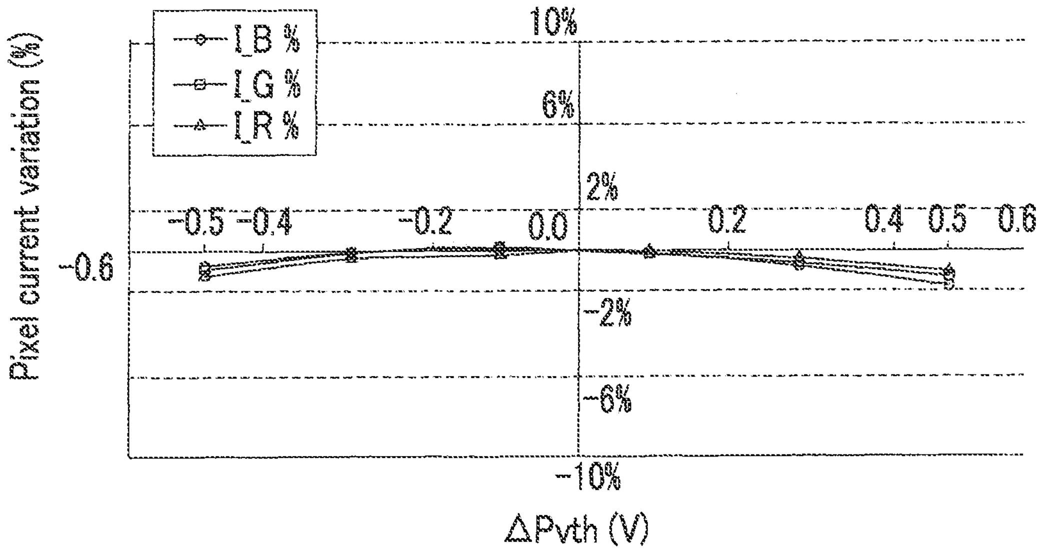
FIG. 6 is a graph showing a current variation of a pixel for a threshold voltage variation in pixel driving of a display device according to an exemplary embodiment of the present invention.

FIG. 5 is a graph showing a current variation of a pixel for a threshold voltage variation in pixel driving of a conventional display device. FIG. 6 is a graph showing a current variation of a pixel for a threshold voltage variation in pixel driving of a display device according to an exemplary embodiment of the present invention. The compensation capability of the threshold voltage under the pixel driving of the display device according to an exemplary embodiment of the present invention is clear through the comparison of FIG. 5 and FIG. 6.

FIG. 5 and FIG. 6 show the change of the currents I_B, I_G, and I_R of the pixels according to the change of threshold voltage Vth±0.5 V in the case of applying the pixel driving timing of the respective display device. Referring to FIG. 6, the change of the pixel current is less than a maximum of ±2% for the change of the threshold voltage Vth±0.5V according to an embodiment of the present. On the other hand, as shown in FIG. 5, when comparing the change of the pixel current, it is in the range of a maximum of ±9 to 10% for the change of the threshold voltage Vth±0.5V in the pixel of the conventional OLED display. Accordingly, it may be confirmed that the current change may be significantly reduced through embodiments of the present invention.

As described above, the display device and the driving method according to an exemplary embodiment of the present invention may significantly reduce the change of the driving current caused by the variation of the threshold voltage of the driving transistor between the different pixels.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

100: display device
10: display unit
20: scan driver
30: data driver
40: light emission control driver
50: signal controller
60: power supply unit

What is claimed is:

1. A display device comprising:

a display unit for driving in frames, each frame comprising a plurality of horizontal cycles, the display unit comprising a plurality of pixels arranged in rows corresponding to the horizontal cycles, the pixels being coupled to a plurality of scan lines for transmitting a plurality of scan signals, a plurality of data lines for transmitting a plurality of data signals, and a plurality of light emission control lines for transmitting a light emission control signal; a scan driver for transmitting the plurality of scan signals; a data driver for transmitting the plurality of data signals; and a light emission control driver for transmitting the light emission control signal, the scan signals comprising a first scan signal and a second scan signal, each for sequentially transmitting to the rows each frame in correspondence with the horizontal cycles, the first scan signal further for transmitting in a first wave and a second wave each frame, the second wave lagging the first wave by a gap of two or more of the horizontal cycles with the second scan signal transmitting during the gap, wherein each of the plurality of pixels comprises:

an organic light emitting diode (OLED);

a driving transistor for transmitting a driving current to the OLED according to one of the data signals;

a first transistor for transmitting the one of the data signals to the driving transistor during a scan period according to the first scan signal as transmitted in the second wave; and a first capacitor comprising a first terminal coupled to the first transistor and a second terminal coupled to a gate electrode of the driving transistor;

a first switch for transmitting an initialization voltage to the second terminal during an initialization period according to the first scan signal as transmitted in the first wave;

a second switch for transmitting an assistance voltage to the first terminal during the initialization period according to the first scan signal as transmitted in the first wave; and a third switch for transmitting the assistance voltage to the first terminal during a threshold voltage compensation period following the initialization period according to the second scan signal, and wherein for each pixel of the plurality of pixels the second terminal is for receiving the initialization voltage during the initialization period for initializing a gate voltage of the driving transistor to the initialization voltage, the first terminal is for receiving the assistance voltage during the initialization period to initialize the first terminal to the assistance voltage and during the threshold voltage compensation period to maintain the first terminal at the assistance voltage, the driving transistor of the pixel is further configured to be diode-connected throughout the threshold voltage compensation period for compensating a threshold voltage of the driving transistor while the first terminal maintains the assistance voltage, and the threshold voltage compensation period for the pixel is longer than the scan period for turning on the first transistor of the pixel according to the first scan signal as transmitted in the second wave.

2. The display device of claim 1, wherein the plurality of scan lines comprises a plurality of second scan lines for transmitting the first wave of the first scan signal to the plurality of pixels, and the scan driver is further for:

generating the first wave of the first scan signal for controlling a switching operation of the first switch for transmitting the initialization voltage to the second terminal and of the second switch for transmitting the assistance voltage to the first terminal in the plurality of pixels; and transmitting the first wave of the first scan signal to each of the pixels through a corresponding one of the plurality of second scan lines.

3. The display device of claim 1, wherein for each of the pixels the scan driver is further for transmitting the first wave of the first scan signal for controlling a switching operation of the first switch for transmitting the initialization voltage to the second terminal and of the second switch for transmitting the assistance voltage to the first terminal, and transmitting the first wave of the first scan signal earlier by a period corresponding to the threshold voltage compensation period than the second wave of the first scan signal.

4. The display device of claim 1, wherein each of the plurality of pixels further comprises:

a fourth switch for diode-connecting the driving transistor.

5. The display device of claim 4, wherein the plurality of scan lines comprises a plurality of second scan lines for transmitting the second scan signal to the plurality of pixels, and the scan driver is further for:

generating the second scan signal for controlling a switching operation of the fourth switch for diode-connecting the driving transistor and of the third switch for transmitting the assistance voltage to the first terminal in the plurality of pixels; and transmitting the second scan signal to each of the pixels through a corresponding one of the plurality of second scan lines.

6. The display device of claim 1, wherein each of the plurality of pixels further comprises a fourth switch for transmitting the driving current from the driving transistor to the OLED according to the light emission control signal during a light emitting period in which the OLED is for:

receiving the driving current according to the one of the data signals; and emitting light in response to the received driving current.

7. The display device of claim 1, wherein each of the plurality of pixels further comprises a storage capacitor coupled to a first power source and the gate electrode of the driving transistor, for charging a voltage corresponding to the threshold voltage of the driving transistor.

8. The display device of claim 1, wherein the threshold voltage compensation period is at least twice the initialization period.

9. The display device of claim 1, wherein the threshold voltage compensation period is at least 2 of the horizontal cycles.

10. A pixel comprising:

an organic light emitting diode (OLED);

a driving transistor for driving in frames, each frame for transmitting a driving current to the OLED according to a transmitted data signal;

a first transistor for transmitting the data signal to the driving transistor during a scan period according to a first scan signal as transmitted in a second wave of each frame; and a first capacitor comprising a first terminal coupled to the first transistor and a second terminal coupled to a gate electrode of the driving transistor;

a first switch for transmitting an initialization voltage to the second terminal during an initialization period according to the first scan signal as transmitted in a first wave of each frame, the first wave preceding the second wave each frame by a gap of two or more horizontal cycles of the frame;

a second switch for transmitting an assistance voltage to the first terminal during the initialization period according to the first scan signal as transmitted in the first wave; and a third switch for transmitting the assistance voltage to the first terminal during a threshold voltage compensation period following the initialization period according to a second scan signal transmitted during the gap each frame, wherein the second terminal is for receiving the initialization voltage during the initialization period for initializing a gate voltage of the driving transistor to the initialization voltage, the first terminal is for receiving the assistance voltage during the initialization period to initialize the first terminal to the assistance voltage and during the threshold voltage compensation period to maintain the first terminal at the assistance voltage, the driving transistor of the pixel is further configured to be diode-connected throughout the threshold voltage compensation period for compensating a threshold voltage of the driving transistor while the first terminal maintains the assistance voltage, and the threshold voltage compensation period for the pixel is longer than the scan period for turning on the first transistor of the pixel according to the first scan signal as transmitted in the second wave.

11. The pixel of claim 10, wherein the first switch and the second switch are further for receiving the first wave of the first scan signal for controlling a switching operation of the first switch and the second switch from a scan driver for generating and transmitting the first wave and the second wave of the first scan signal.

12. The pixel of claim 11, wherein the scan driver is further for transmitting the first wave of the first scan signal earlier by a period corresponding to the threshold voltage compensation period than the second wave of the first scan signal.

13. The pixel of claim 10, further comprising:

a fourth switch for diode-connecting the driving transistor.

14. The pixel of claim 13, wherein the fourth switch and the third switch are further for receiving the second scan signal for controlling a switching operation of the fourth switch and the third switch from a scan driver for generating and transmitting the first scan signal and the second scan signal.

15. The pixel of claim 10, further comprising a fourth switch for transmitting the driving current from the driving transistor to the OLED according to a light emission control signal during a light emitting period in which the OLED is for:

receiving the driving current according to the data signal; and emitting light in response to the received driving current.

16. The pixel of claim 10, further comprising a storage capacitor coupled to a first power source and the gate electrode of the driving transistor, for charging a voltage corresponding to the threshold voltage of the driving transistor.

17. The pixel of claim 10, wherein the threshold voltage compensation period is at least twice the initialization period.

18. The pixel of claim 10, wherein the threshold voltage compensation period is at least 2 of the horizontal cycles.

19. A method for driving a pixel in frames, each frame comprising a plurality of horizontal cycles, the pixel comprising an organic light emitting diode (OLED), a driving transistor for controlling a current supplied to the OLED, a first transistor for transmitting a data signal to the driving transistor, and a first capacitor comprising a second terminal coupled to a gate electrode of the driving transistor and a first terminal coupled to the first transistor, the method comprising:

initializing a gate voltage of the driving transistor while initializing the first terminal by applying an initialization voltage to the second terminal to initialize the gate voltage of the driving transistor to the initialization voltage while applying an assistance voltage to the first terminal to initialize the first terminal to the assistance voltage according to a first scan signal as transmitted in a first wave of each frame;

diode-connecting the driving transistor to compensate a threshold voltage of the driving transistor after the initializing of the gate voltage of the driving transistor and while applying the assistance voltage to the first terminal to maintain the first terminal at the assistance voltage according to a second scan signal transmitted during a gap of two or more of the horizontal cycles between the transmitting of the first wave of the first scan signal and a transmitting of a second wave of the first scan signal in each frame; and turning on the first transistor to transmit the data signal to the driving transistor through the first capacitor after the diode-connecting of the driving transistor according to the second wave of the first scan signal, wherein a period for the second scan signal is longer than a period for the first scan signal.

20. The method of claim 19, wherein the compensating of the threshold voltage comprises:

charging a voltage corresponding to the threshold voltage of the driving transistor to a storage capacitor coupled between the gate electrode of the driving transistor and a first power source while the driving transistor is diode-connected.

21. The method of claim 19, wherein the period for the second scan signal is at least twice the period for the first scan signal.

22. The method of claim 19, wherein the period for the second scan signal is at least 2 of the horizontal cycles.

23. A method for driving a display device in frames, each frame comprising a plurality of horizontal cycles, the display device comprising a plurality of pixels arranged in rows corresponding to the horizontal cycles, the pixels being, each of the pixels comprising an organic light emitting diode (OLED), a driving transistor for controlling a current supplied to the OLED, a first transistor for transmitting a data signal to the driving transistor, and a first capacitor comprising a second terminal coupled to a gate electrode of the driving transistor and a first terminal coupled to the first transistor, the method comprising for each pixel of the plurality of pixels:

initializing a gate voltage of the driving transistor while initializing the first terminal by applying an initialization voltage to the second terminal to initialize the gate voltage of the driving transistor to the initialization voltage while applying an assistance voltage to the first terminal to initialize the first terminal to the assistance voltage according to a first scan signal as transmitted in a first wave of each frame;

diode-connecting the driving transistor to compensate a threshold voltage of the driving transistor after the initializing of the gate voltage of the driving transistor and while applying the assistance voltage to the first terminal to maintain the first terminal at the assistance voltage according to a second scan signal transmitted during a gap of two or more of the horizontal cycles between the transmitting of the first wave of the first scan signal and a transmitting of a second wave of the first scan signal in each frame; and turning on the first transistor to transmit the data signal to the driving transistor through the first capacitor after the diode-connecting of the driving transistor according to the second wave of the first scan signal, wherein a period for the second scan signal is longer than a period for the first scan signal.

24. The method of claim 23, wherein the compensating of the threshold voltage comprises:

charging a voltage corresponding to the threshold voltage of the driving transistor to a storage capacitor coupled between the gate electrode of the driving transistor and a first power source while the driving transistor is diode-connected.

25. The method of claim 23, wherein the period for the second scan signal is at least twice the period for the first scan signal.

26. The method of claim 13, wherein the period for the second scan signal is at least 2 of the horizontal cycles.

* * * * *